(12) United States Patent
Gao

(10) Patent No.: US 12,358,508 B2
(45) Date of Patent: Jul. 15, 2025

(54) LANE CHANGE TRACK PLANNING METHOD AND APPARATUS

(71) Applicant: Shenzhen Yinwang Intelligent Technologies Co., Ltd., Shenzhen (CN)

(72) Inventor: Xiaobin Gao, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 18/175,106

(22) Filed: Feb. 27, 2023

(65) Prior Publication Data

US 2023/0256970 A1 Aug. 17, 2023

Related U.S. Application Data

(63) Continuation of application No. PCT/CN2021/091075, filed on Apr. 29, 2021.

(30) Foreign Application Priority Data

Aug. 28, 2020 (CN) .......................... 202010882785.5

(51) Int. Cl.
B60W 30/18 (2012.01)
B60W 60/00 (2020.01)

(52) U.S. Cl.
CPC .... *B60W 30/18163* (2013.01); *B60W 60/001* (2020.02); *B60W 2520/10* (2013.01); *B60W 2710/20* (2013.01)

(58) Field of Classification Search
CPC ......... B60W 30/18163; B60W 60/001; B60W 2520/10; B60W 2710/20; B60W 2540/18; B60W 2710/207; B60W 60/0015
See application file for complete search history.

(56) References Cited

U.S. PATENT DOCUMENTS 6,321,159 B1 * 11/2001 Nohtomi .................. B62D 1/28
701/28
9,227,632 B1 1/2016 Lee
(Continued)

FOREIGN PATENT DOCUMENTS

CN 107792073 A 3/2018
CN 108387242 A 8/2018
(Continued)

OTHER PUBLICATIONS

Jiajia Chen et al., "Lane Change Path Planning Based on Piecewise Bezier Curve for Autonomous Vehicle," Oct. 7, 2013. Proceedings of 2013 IEEE International Conference on Vehicular Electronics and Safety, 6 pages.

(Continued)

*Primary Examiner* — Mary Cheung

(74) *Attorney, Agent, or Firm* — Conley Rose, P.C.

(57) ABSTRACT

A lane change track planning method includes obtaining a current vehicle speed of a vehicle; determining a sampling interval that is of a lane change control parameter and that corresponds to the current vehicle speed; performing sampling in the sampling interval of the lane change control parameter to obtain a lane change control parameter set; determining a change with time of the lane change control parameter set; and planning a lane change track that is of the vehicle and that corresponds to the lane change control parameter set.

20 Claims, 7 Drawing Sheets

(56) References Cited

U.S. PATENT DOCUMENTS

| | | | |
|---|---|---|---|
| 9,643,650 B2* | 5/2017 | Sim | B60K 31/0008 |
| 2012/0029773 A1* | 2/2012 | Fujita | B62D 6/00 |
| | | | 701/41 |
| 2012/0123643 A1* | 5/2012 | Limpibuntering | B62D 1/286 |
| | | | 701/42 |
| 2017/0364083 A1 | 12/2017 | Yang et al. | |
| 2019/0100211 A1 | 4/2019 | Liu et al. | |
| 2019/0122556 A1 | 4/2019 | Thapani et al. | |

FOREIGN PATENT DOCUMENTS

| | | | | |
|---|---|---|---|---|
| CN | 108519773 A | | 9/2018 | |
| CN | 108820039 A | * | 11/2018 | B62D 6/00 |
| CN | 109855639 A | | 6/2019 | |
| CN | 107215339 B | * | 8/2019 | B60W 10/20 |
| CN | 110304045 A | | 10/2019 | |
| CN | 110562258 A | | 12/2019 | |
| CN | 110712680 A | | 1/2020 | |
| CN | 111164455 A | | 5/2020 | |
| CN | 111267857 A | | 6/2020 | |
| CN | 112519882 A | * | 3/2021 | B60W 50/00 |
| CN | 111752168 B | * | 4/2021 | G05B 17/02 |
| DE | 102016220717 A1 | | 5/2018 | |
| EP | 2586679 B1 | * | 8/2016 | B62D 15/025 |
| EP | 3805073 A1 | | 4/2021 | |

OTHER PUBLICATIONS

Moritz Werling et al., "Optimal Trajectory Generation for Dynamic Street Scenarios in a Fren'et Frame," 2010 IEEE International Conference on Robotics and Automation Anchorage Convention District Anchorage Convention District, May 3-8, 2010, 7 pages.

* cited by examiner

LANE CHANGE TRACK PLANNING METHOD AND APPARATUS

CROSS-REFERENCE TO RELATED APPLICATIONS

This application is a continuation application of International Patent Application No. PCT/CN2021/091075, filed on Apr. 29, 2021, which claims priority to Chinese Patent Application No. 202010882785.5, filed on Aug. 28, 2020. The disclosures of the aforementioned applications are hereby incorporated by reference in their entireties.

TECHNICAL FIELD

This application relates to the autonomous driving field, furthermore, to a lane change track planning method and apparatus.

BACKGROUND

A lane change refers to behavior of changing a vehicle from one lane to another lane, and usually occurs between parallel lanes or in a place in which vehicles are forcibly required to enter, such as a high-speed intersection. Currently, with development of artificial intelligence, autonomous driving develops rapidly. In an autonomous driving system, planning of a lane change track of a vehicle is a hot topic. A planned lane change track needs to ensure functionality, safety, efficiency, and comfort of lane changes in different driving scenarios.

In a conventional lane change track planning method, lane change time and a lane change target point need to be sampled, then the lane change target point is connected to a lane change start location based on a preset polynomial curve, to generate a plurality of lane change tracks, and finally safety of the plurality of lane change tracks is evaluated, to select a lane change track with a high safety coefficient as a final lane change track of a vehicle.

However, if the vehicle travels based on the lane change track generated based on the polynomial curve, during approach in a lane change process, a steering wheel rotation speed adjustment speed of the vehicle is excessively high or a steering wheel rotation angle is excessively large, resulting in somatosensory discomfort of a passenger in the vehicle.

SUMMARY

This application provides a lane change track planning method and apparatus, to improve properness of lane change track planning.

According to a first aspect, a lane change track planning method is provided, including: obtaining a current vehicle speed of a vehicle; determining, based on the current vehicle speed of the vehicle and a preset correspondence between a vehicle speed and a sampling interval of a lane change control parameter, a sampling interval that is of a lane change control parameter and that corresponds to the current vehicle speed, where the lane change control parameter includes at least two of a steering wheel rotation angle of the vehicle, a steering wheel rotation speed of the vehicle, and a course angle deviation of the vehicle, and the course angle deviation of the vehicle is used to indicate a degree of change between a current course angle of the vehicle and a course angle of the vehicle in a lane change process; performing sampling in the sampling interval of the lane change control parameter to obtain one or more lane change control parameter sets; determining, based on the one or more lane change control parameter sets, a change with time of each of the one or more lane change control parameter sets in the lane change process; and planning, based on the change with time of each of the one or more lane change control parameter sets, a lane change track that is of the vehicle and that corresponds to each of the one or more lane change control parameter sets.

The solution in this embodiment of this application aims to comprehensively consider at least two lane change control parameters of the steering wheel rotation angle of the vehicle, the steering wheel rotation speed of the vehicle, and the course angle deviation of the vehicle in a process of planning the lane change track, perform the sampling in the sampling interval of the lane change control parameter to obtain a plurality of groups of sampling points of the lane change control parameter, and finally plan the lane change track of the vehicle based on the plurality of groups of the sampling points to improve properness of the lane change track. This avoids a problem that in an existing lane change track planning solution, if the vehicle travels based on a lane change track generated based on a polynomial curve, during approach in a lane change process, a steering wheel rotation speed adjustment speed of the vehicle is excessively high or the steering wheel rotation angle is excessively large, resulting in somatosensory discomfort of a passenger in the vehicle.

In some embodiments, the sampling interval is also referred to as a "sampling interval of a control domain". In other words, a control parameter obtained by performing sampling in the sampling interval of the control domain may be directly used as a parameter for controlling the lane change track of the vehicle, to improve efficiency of planning the lane change track of the vehicle.

In a possible implementation, if the lane change control parameter includes the steering wheel rotation angle, the correspondence between the vehicle speed and the sampling interval of the lane change control parameter is represented by using a correspondence between a vehicle speed and a maximum steering wheel rotation angle, and the correspondence between the vehicle speed and the maximum steering wheel rotation angle is used to indicate a maximum steering wheel rotation angle allowed by the vehicle at different vehicle speeds; and the determining, based on the current vehicle speed of the vehicle and a preset correspondence between a vehicle speed and a sampling interval of a lane change control parameter, a sampling interval that is of a lane change control parameter and that corresponds to the current vehicle speed includes determining, based on the pre-stored correspondence between the vehicle speed and the maximum steering wheel rotation angle, a maximum steering wheel rotation angle corresponding to the current vehicle speed; and determining a sampling interval of a steering wheel rotation angle corresponding to the current vehicle speed, where a steering wheel rotation angle included in the sampling interval of the steering wheel rotation angle is less than the maximum steering wheel rotation angle corresponding to the current vehicle speed.

In this embodiment of this application, the maximum steering wheel rotation angle corresponding to the current vehicle speed is determined based on the pre-stored correspondence between the vehicle speed and the maximum steering wheel rotation angle, and the sampling interval of the steering wheel rotation angle is determined based on the maximum steering wheel rotation angle, which helps improve properness of determining the sampling interval of the steering wheel rotation angle.

In a possible implementation, if the lane change control parameter includes the steering wheel rotation speed, the correspondence between the vehicle speed and the sampling interval of the lane change control parameter is represented by using a correspondence between a vehicle speed and a maximum steering wheel rotation speed, and the correspondence between the vehicle speed and the maximum steering wheel rotation speed is used to indicate a maximum steering rotation speed allowed by the vehicle at different vehicle speeds; and the determining, based on the current vehicle speed of the vehicle and a correspondence between a vehicle speed and a sampling interval of a lane change control parameter, a sampling interval that is of a lane change control parameter and that corresponds to the current vehicle speed includes determining, based on the pre-stored correspondence between the vehicle speed and the maximum steering wheel rotation speed, a maximum steering wheel rotation speed corresponding to the current vehicle speed; and determining a sampling interval of a steering wheel rotation speed corresponding to the current vehicle speed, where a steering wheel rotation speed included in the sampling interval of the steering wheel rotation speed is less than the maximum steering wheel rotation speed corresponding to the current vehicle speed.

In this embodiment of this application, the maximum steering wheel rotation speed corresponding to the current vehicle speed is determined based on the pre-stored correspondence between the vehicle speed and the maximum steering wheel rotation speed, and the sampling interval of the steering wheel rotation speed is determined based on the maximum steering wheel rotation speed, which helps improve properness of determining the sampling interval of the steering wheel rotation speed.

In a possible implementation, if the lane change control parameter includes the course angle deviation, the correspondence between the vehicle speed and the sampling interval of the lane change control parameter is represented by using a correspondence between a vehicle speed and a maximum course angle deviation, and the correspondence between the vehicle speed and the maximum course angle deviation is used to indicate a maximum course angle deviation allowed by the vehicle at different vehicle speeds; and the determining, based on the current vehicle speed of the vehicle and a correspondence between a vehicle speed and a sampling interval of a lane change control parameter, a sampling interval that is of a lane change control parameter and that corresponds to the current vehicle speed includes determining, based on the pre-stored correspondence between the vehicle speed and the maximum course angle deviation, a maximum course angle deviation corresponding to the current vehicle speed; and determining a sampling interval of a course angle deviation corresponding to the current vehicle speed, where a course angle deviation included in the sampling interval of the course angle deviation is less than the maximum course angle deviation corresponding to the current vehicle speed.

In this embodiment of this application, the maximum course angle deviation corresponding to the current vehicle speed is determined based on the pre-stored correspondence between the vehicle speed and the maximum course angle deviation, and the sampling interval of the course angle deviation is determined based on the maximum course angle deviation, which helps improve properness of determining the sampling interval of the course angle deviation.

In a possible implementation, if the lane change track that is of the vehicle and that corresponds to each of the plurality of lane change control parameter sets is a plurality of lane change tracks, the method further includes calculating a change of a steering wheel rotation angle required when the vehicle changes a lane based on each of the plurality of lane change tracks, and/or lane change time required when the vehicle changes a lane based on each of the plurality of lane change tracks; and calculating the change of the steering wheel rotation angle and/or the lane change time, and selecting a first lane change track from the plurality of lane change tracks.

In this embodiment of this application, the first lane change track is selected from the plurality of lane change tracks based on the change of the steering wheel rotation angle and/or the lane change time, which helps improve properness of selecting the lane change track.

In a possible implementation, the calculating, based on the one or more lane change control parameter sets, a change with time of each of the one or more lane change control parameter sets in the lane change process includes determining, based on a steering wheel rotation angle in each of the one or more lane change control parameter sets and a preset change trend of the steering wheel rotation angle with time, a change amount of a steering wheel rotation angle that needs to be executed by the vehicle in each segment of the change trend; and calculating, based on the change amount that is of the steering wheel rotation angle and that corresponds to each segment of the change trend and a lane change control parameter other than the steering wheel rotation angle in each lane change control parameter, time required by the vehicle to complete each segment of the change trend in the change trend, to obtain the change with time of each lane change control parameter set.

In this embodiment of this application, the change amount of the steering wheel rotation angle that needs to be executed by the vehicle in each segment of the change trend is determined based on the preset change trend of the steering wheel rotation angle with time; and the time required by the vehicle to complete each segment of the change trend in the change trend is calculated based on the change amount that is of the steering wheel rotation angle and that corresponds to each segment of the change trend and a lane change control parameter other than the steering wheel rotation angle in each lane change control parameter, to obtain the change with time of each lane change control parameter set, which helps simplify the method for obtaining the change with time of each lane change control parameter set.

According to a second aspect, a lane change track planning apparatus is provided. The apparatus includes units configured to perform any one of the first aspect or the possible implementations of the first aspect.

According to a third aspect, a lane change track planning apparatus is provided. The apparatus has a function of implementing the apparatus in the method design according to the first aspect. The function may be implemented by hardware, or may be implemented by hardware by executing corresponding software. The hardware or the software includes one or more units corresponding to the foregoing function.

According to a fourth aspect, a computing device is provided, including an input/output interface, a processor, and a memory. The processor is configured to control the input/output interface to receive and send a signal or information, and the memory is configured to store a computer program. The processor is configured to invoke the computer program from the memory and run the computer program, to enable the computing device to perform the method according to the first aspect.

According to a fifth aspect, a computer program product is provided. The computer program product includes computer program code, and when the computer program code is run on a computer, the computer is enabled to perform the methods according to the foregoing aspects.

It should be noted that all or some of the computer program code may be stored in a first storage medium. The first storage medium may be encapsulated together with a processor, or may be encapsulated separately from a processor. This is not limited in this embodiment of this application.

According to a sixth aspect, a computer-readable medium is provided. The computer-readable medium stores program code. When the computer program code is run on a computer, the computer is enabled to perform the methods according to the foregoing aspects.

According to a seventh aspect, a chip system is provided. The chip system includes a processor that is used by a computing device to implement functions according to the foregoing aspects, for example, generate, receive, send, or process data and/or information according to the foregoing methods. In a possible design, the chip system further includes a memory. The memory is configured to store program instructions and data that are necessary for the computing device. The chip system may include a chip, or may include a chip and another discrete component.

DESCRIPTION OF EMBODIMENTS

The following describes technical solutions of this application with reference to accompanying drawings. To facilitate understanding, a scenario to which embodiments of this application are applicable is described below with reference to FIG. 1 by using an intelligent driving scenario as an example.

Figure 1:
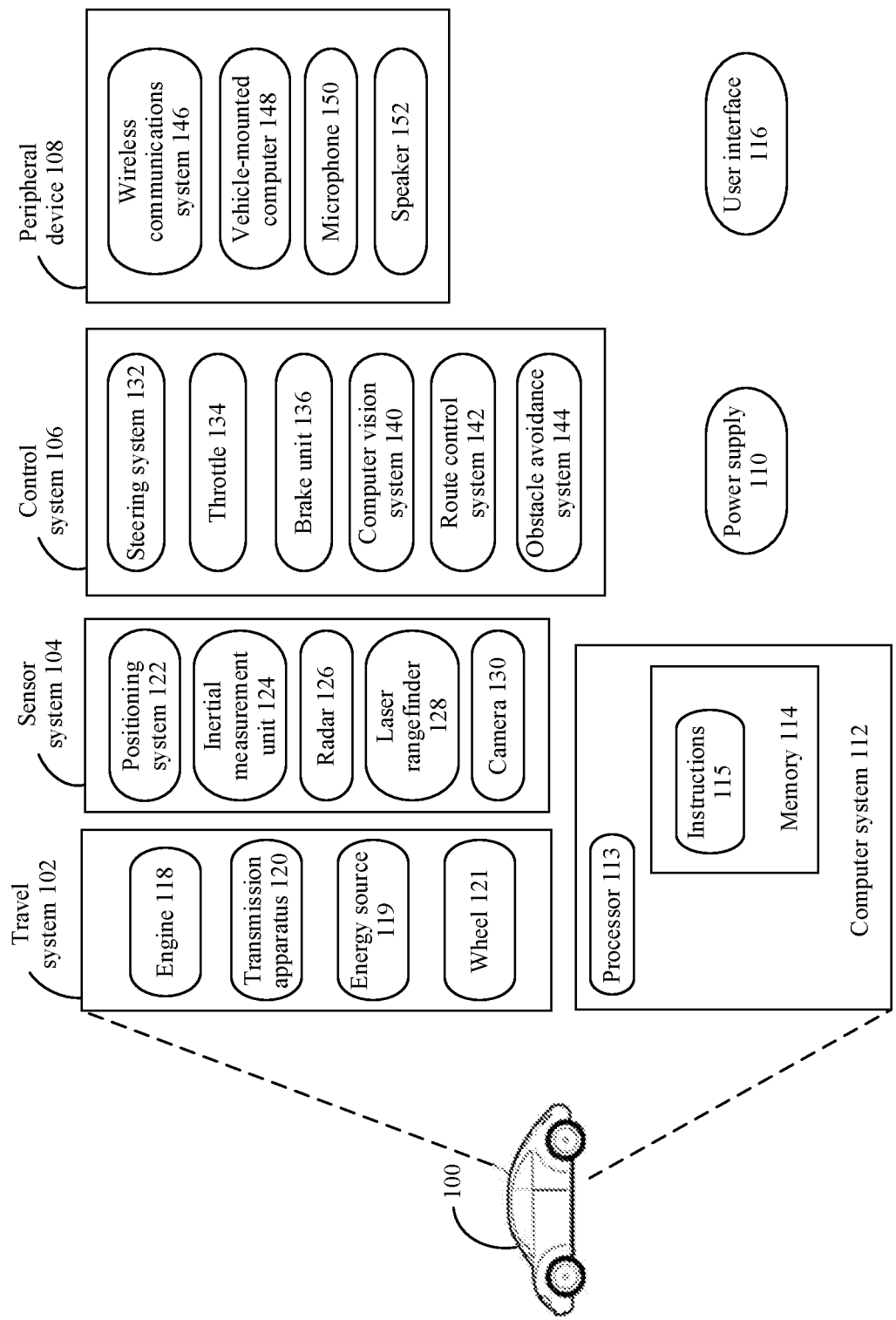
FIG. 1 is a functional block diagram of a vehicle 100 according to an embodiment of this application.

FIG. 1 is a functional block diagram of a vehicle 100 according to an embodiment of this application. In an embodiment, the vehicle 100 is configured to be in a fully or partially autonomous driving mode. For example, the vehicle 100 in an autonomous driving mode may control the vehicle 100, and may determine current statuses of the vehicle and an ambient environment of the vehicle through a manual operation, determine possible behavior of at least one another vehicle in the ambient environment, determine a confidence level corresponding to a possibility that another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, such as a travel system 102, a sensor system 104, a control system 106, one or more peripheral devices 108, a power supply 110, a computer system 112, and a user interface 116. In some embodiments, the vehicle 100 may include more or fewer subsystems, and each subsystem may include a plurality of components. In addition, each subsystem and component of the vehicle 100 may be interconnected in a wired or wireless manner.

The travel system 102 may include a component that provides power for the vehicle 100 to move. In an embodiment, the travel system 102 may include an engine 118, an energy source 119, a transmission apparatus 120, and wheels/tires 121. The engine 118 may be an internal combustion type engine, a motor, an air compression engine, or another type of engine combination, for example, a hybrid engine including a gasoline engine and a motor, or a hybrid engine including an internal combustion type engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, or other power sources. The energy source 119 may also provide energy to another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that sense information about the ambient environment of the vehicle 100. For example, the sensor system 104 may include a positioning system 122 (the positioning system may be a Global Positioning System (GPS), or may be a BEIDOU system or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a position, a shape, a direction, a speed, and the like) of the object. Such detection and recognition are key functions of a safe operation of the autonomous vehicle 100.

The positioning system 122 may be configured to estimate a geographical location of the vehicle 100. The IMU 124 is configured to sense a location and an orientation change of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing a target object, the radar 126 may be further configured to sense one or more states of a speed, a location, and a forward direction of the target object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various elements, including a steering system 132, a throttle 134, a brake unit 136, a computer vision system 140, a route control system 142, and an obstacle avoidance system 144.

The steering system 132 may be operated to adjust a moving direction of the vehicle 100. For example, in an embodiment, the steering system 132 may be a steering wheel system. The control parameter in the lane change process in embodiments of this application may be understood as a control parameter for the steering system 132.

The throttle 134 is configured to: control an operating speed of the engine 118 and further control a speed of the vehicle 100.

The brake unit 136 is configured to control the vehicle 100 to decelerate. The brake unit 136 may use friction to slow down the wheel 121. In another embodiment, the brake unit 136 may convert kinetic energy of the wheel 121 into a current. The brake unit 136 may alternatively use another form to reduce a rotation speed of the wheel 121, to control the speed of the vehicle 100.

The computer vision system 140 may operate to process and analyze an image captured by the camera 130, to identify an object and/or a feature in the ambient environment of the vehicle 100. The object and/or the feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to: draw a map for an environment, track an object, estimate a speed of the object, and the like.

The route control system 142 is configured to determine a travel route of the vehicle 100. In some embodiments, the route control system 142 may determine the travel route for the vehicle 100 based on data from the sensors, the GPS 122, and one or more predetermined maps. In this embodiment of this application, the route control system 142 may further plan a lane change track of the vehicle.

The obstacle avoidance system 144 is configured to: identify, evaluate, and avoid or bypass a potential obstacle in the environment of the vehicle 100 in another manner.

Certainly, in an example, the control system 106 may add or alternatively include components other than those shown and described. Alternatively, the control system 106 may delete some of the foregoing components.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152.

In some embodiments, the peripheral device 108 provides a means for the user of the vehicle 100 to interact with the user interface 116. For example, the vehicle-mounted computer 148 may provide information for the user of the vehicle 100. The user interface 116 may further operate the vehicle-mounted computer 148 to receive a user input. The vehicle-mounted computer 148 may perform operations through a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100.

The wireless communications system 146 may wirelessly communicate with one or more devices directly or through a communications network. For example, the wireless communications system 146 may use 3G cellular communication such as code-division multiple access (CDMA), a Global System for Mobile Communications (GSM)/General Packet Radio Service (GPRS), a 4th generation (4G) communication such as Long-Term Evolution (LTE), or a 5th generation (5G) communication. The wireless communications system 146 may communicate with a wireless local area network (WLAN) through WIFI. In some embodiments, the wireless communications system 146 may directly communicate with a device by using an infrared link, BLUETOOTH, or ZIGBEE). Other wireless protocols, for example, various vehicle communications systems, such as the wireless communications system 146, may include one or more dedicated short range communications (DSRC) devices, and these devices may include public and/or private data communication between vehicle and/or roadside stations.

The power supply 110 may provide power to various components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113. The processor 113 executes instructions 115 stored in a non-transitory computer-readable medium such as a data memory 114. The computer system 112 may alternatively be a plurality of computing devices that control an individual component or a subsystem of the vehicle 100 in a distributed manner.

The processor 113 may be any conventional processor, such as a commercially available central processing unit (CPU). Alternatively, the processor may be a dedicated device such as an application-specific integrated circuit (ASIC) or another hardware-based processor. Although FIG. 1 functionally illustrates the processor, the memory, and other components of the computer 110 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Therefore, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 114 may include the instructions 115 (for example, program logic), and the instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, and a location, a direction, a speed, and other such vehicle data of the vehicle, and other information. Such information may be used by the vehicle 100 and the computer system 112 when the vehicle 100 operates in an autonomous mode, a semi-autonomous mode, and/or a manual mode.

In some embodiments, the processor 113 may further execute a solution for planning a vertical motion parameter of the vehicle in this embodiment of this application, to help the vehicle plan the vertical motion parameter. For a method for planning the vertical motion parameter, refer to the following description of FIG. 3. For brevity, details are not described herein.

The user interface 116 is used to provide information for or receive information from the user of the vehicle 100. In some embodiments, the user interface 116 may include one or more input/output devices within a set of peripheral devices 108, for example, the wireless communications system 146, the vehicle-mounted computer 148, the microphone 150, and the speaker 152.

The computer system 112 may control the functions of the vehicle 100 based on inputs received from the various subsystems (for example, the travel system 102, the sensor system 104, and the control system 106) and from the user interface 116. For example, the computer system 112 may use input from the control system 106 to control the steering unit 132 to avoid an obstacle detected by the sensor system 104 and the obstacle avoidance system 144. In some embodiments, the computer system 112 may operate to provide control on the vehicle 100 and the subsystems of the vehicle 100 in many aspects.

In some embodiments, one or more of the foregoing components may be installed separately from or associated with the vehicle 100. For example, the memory 114 may be partially or completely separated from the vehicle 100. The foregoing components may be communicatively coupled together in a wired and/or wireless manner.

In some embodiments, the foregoing components are merely examples. In actual application, components in the foregoing modules may be added or deleted based on an actual requirement. FIG. 1 should not be understood as a limitation on this embodiment of the present disclosure.

An autonomous vehicle traveling on a road, for example, the vehicle 100, may identify an object in an ambient environment of the autonomous vehicle, to determine to adjust a current speed. The object may be another vehicle, a traffic control device, or another type of object. In some examples, each identified object may be considered independently, and based on features of each object, such as a current speed of the object, acceleration of the object, and a spacing between the object and the vehicle, may be used to determine the speed to be adjusted by the autonomous vehicle.

In some embodiments, the autonomous vehicle 100 or a computing device associated with the autonomous vehicle 100 (for example, the computer system 112, the computer vision system 140, or the memory 114 in FIG. 1) may predict behavior of the identified object based on a feature of the identified object and a state of the ambient environment (for example, traffic, rain, and ice on a road). In some embodiments, all identified objects depend on behavior of each other, and therefore all the identified objects may be considered together to predict behavior of a single identified object. The vehicle 100 can adjust the speed of the vehicle 100 based on the predicted behavior of the identified object. In other words, the autonomous vehicle can determine, based on the predicted behavior of the object, a stable state to which the vehicle needs to be adjusted (for example, acceleration, deceleration, or stop). In this process, another factor may also be considered to determine the speed of the vehicle 100, for example, a horizontal location of the vehicle 100 on a road on which the vehicle travels, curvature of the road, and proximity between a static object and a dynamic object.

In addition to providing an instruction for adjusting the speed of the autonomous vehicle, the computing device may further provide an instruction for modifying a steering angle of the vehicle 100, so that the autonomous vehicle follows a given track and/or maintains safe lateral and longitudinal distances between the autonomous vehicle and an object (for example, a car in an adjacent lane on the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of the present disclosure.

The foregoing describes, with reference to FIG. 1, a scenario to which embodiments of this application are applicable. The following describes, with reference to FIG. 2, an automated driving system to which embodiments of this application are applicable.

Figure 2:
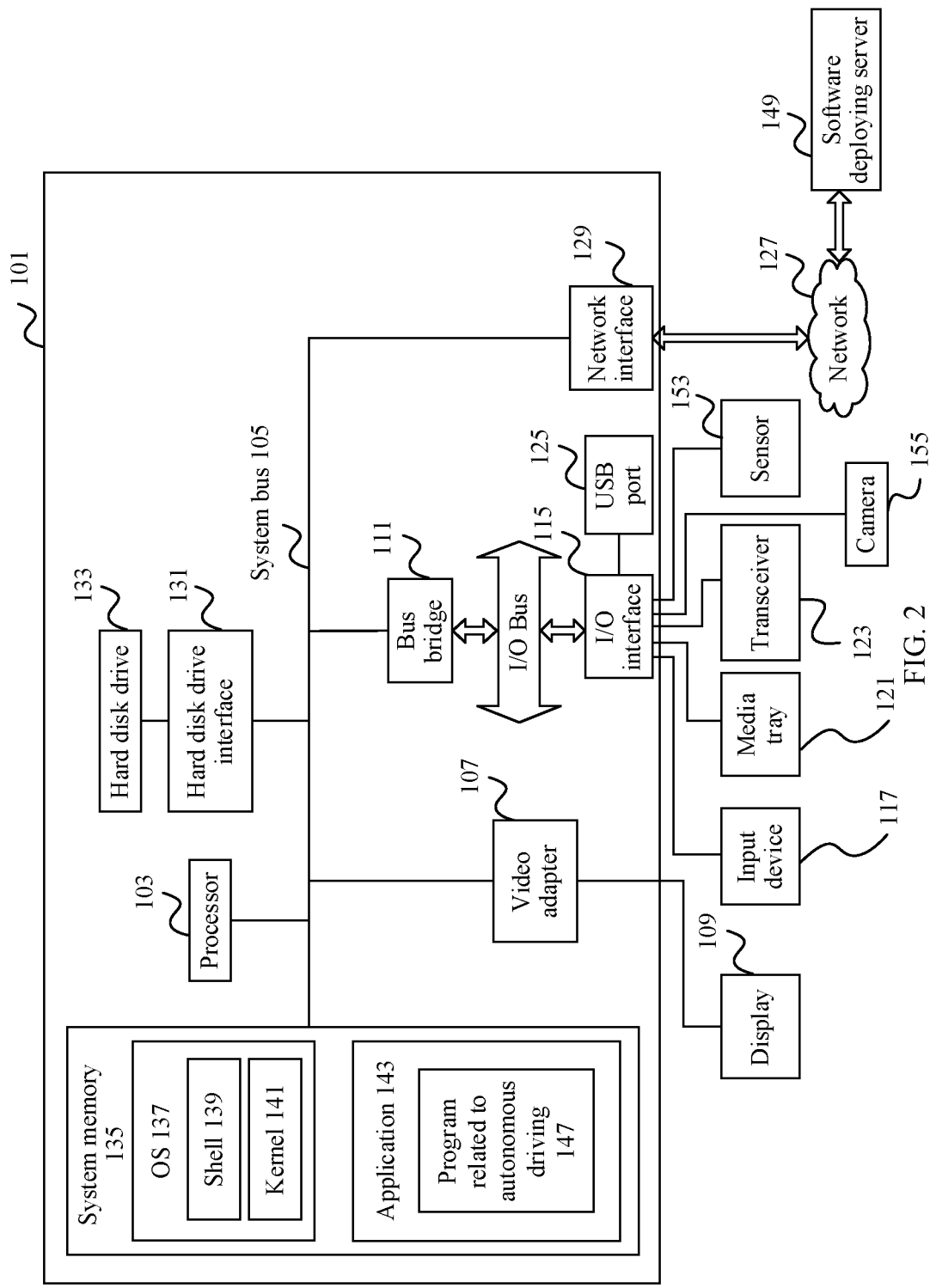
FIG. 2 is a schematic diagram of an automated driving system to which an embodiment of this application is applicable.

FIG. 2 is a schematic diagram of an automated driving system to which an embodiment of this application is applicable. A computer system 101 includes a processor 103, and the processor 103 is coupled to a system bus 105. The processor 103 may be one or more processors, and each processor may include one or more processor cores. The computer system 101 further includes a video adapter 107, the video adapter may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (for example, a keyboard, a mouse, and a touchscreen) and a media tray (media tray) 121 (for example, a compact disk read-only memory (CD-ROM) and a multimedia interface). A transceiver 123 (which may send and/or receive a radio communication signal), a camera 155 (which may capture static and dynamic digital video images), and an external universal serial bus (USB) port 125 are provided. In some embodiments, an interface connected to the I/O interface 115 may be a USB port.

The processor 103 may be any conventional processor, including a reduced instruction set computing (RISC) processor, a complex instruction set computing (CISC) processor, or a combination thereof. In some embodiments, the processor may be a dedicated apparatus such as an ASIC. In some embodiments, the processor 103 may be a neural-network processor or a combination of the neural-network processor and the foregoing conventional processor.

In some embodiments, in various embodiments described in this application, the computer system 101 may be located away from an autonomous vehicle, and may wirelessly communicate with the autonomous vehicle. In other aspect, some of the processes described in this application are performed on a processor disposed inside an autonomous vehicle, and others are performed by a remote processor, including actions required to perform a single operation.

The computer 101 may communicate with a software deploying server 149 through a network interface 129. The network interface 129 is a hardware network interface, for example, a network interface card. A network 127 may be an external network such as the Internet, or may be an internal network such as the Ethernet or a virtual private network (VPN). In some embodiments, the network 127 may alternatively be a wireless network, for example, a WIFI network or a cellular network.

A hard disk drive interface is coupled to the system bus 105. The hardware drive interface is connected to a hard disk drive. A system memory 135 is coupled to the system bus 105. Data running in the system memory 135 may include an operating system 137 and an application 143 of the computer 101.

The operating system includes a shell 139 and a kernel 141. The shell 139 is an interface between a user and the kernel of the operating system. The shell 139 is an outermost layer of the operating system. The shell 139 manages interaction between the user and the operating system: waiting for an input of the user, explaining the input of the user to the operating system, and processing various output results of the operating system.

The kernel 141 includes components of the operating system that are configured to manage a memory, a file, a peripheral, and a system resource. When directly interacting with hardware, the kernel of the operating system usually runs a process, provides inter-process communication, and provides functions such as CPU time slice management, interrupt, memory management, and I/O management.

The application 143 includes programs for controlling autonomous driving of the vehicle, for example, a program that manages interaction between the autonomous vehicle and a road obstacle, a program that controls a route or a speed of the autonomous vehicle, a program that controls interaction between the autonomous vehicle and another autonomous vehicle on a road. The application 143 may be on a system of the software deploying server 149. In an embodiment, when the application 147 needs to be executed, the computer system 101 may download the application 143 from the software deploying server 149.

In some embodiments, the application may further include an application corresponding to a solution of target object perception provided in embodiments of this application. The solution of target object perception in embodiments of this application is described below. For brevity, details are not described herein.

A sensor 153 is associated with the computer system 101. The sensor 153 is configured to detect an ambient environment of the computer 101. For example, the sensor 153 can detect a target object, for example, an animal, a vehicle, and an obstacle. Further, the sensor can detect an ambient environment of the target object, for example, an environment around the animal, another animal around the animal, a weather condition, and brightness of the ambient environment. In some embodiments, if the computer 101 is located on the autonomous vehicle, the sensor may be a laser radar, a camera, an infrared sensor, a chemical detector, a microphone, or the like.

In a conventional lane change track planning method, lane change time and a lane change target point need to be sampled, then the lane change target point is connected to a lane change start location based on a preset polynomial curve, to generate a plurality of lane change tracks, and finally safety of the plurality of lane change tracks is evaluated, to select a lane change track with a high safety coefficient as a final lane change track of a vehicle. However, if the vehicle travels based on the lane change track generated based on the polynomial curve, during approach in a lane change process, a steering wheel rotation speed adjustment speed of the vehicle is excessively high or a steering wheel rotation angle is excessively large, resulting in somatosensory discomfort of a passenger in the vehicle.

To avoid the foregoing problems and improve experience of a passenger in a vehicle in a steering process, this application provides a new lane change track planning method, that is, comprehensively considering at least two lane change control parameters of a steering wheel rotation angle of the vehicle, a steering wheel rotation speed of the vehicle, and a course angle deviation of the vehicle in a process of planning a lane change track, performing sampling in a sampling interval of the lane change control parameter to obtain a plurality of groups of sampling points of the lane change control parameter, and planning the lane change track of the vehicle based on the plurality of groups of the sampling points to improve properness of the lane change track.

Figure 3:
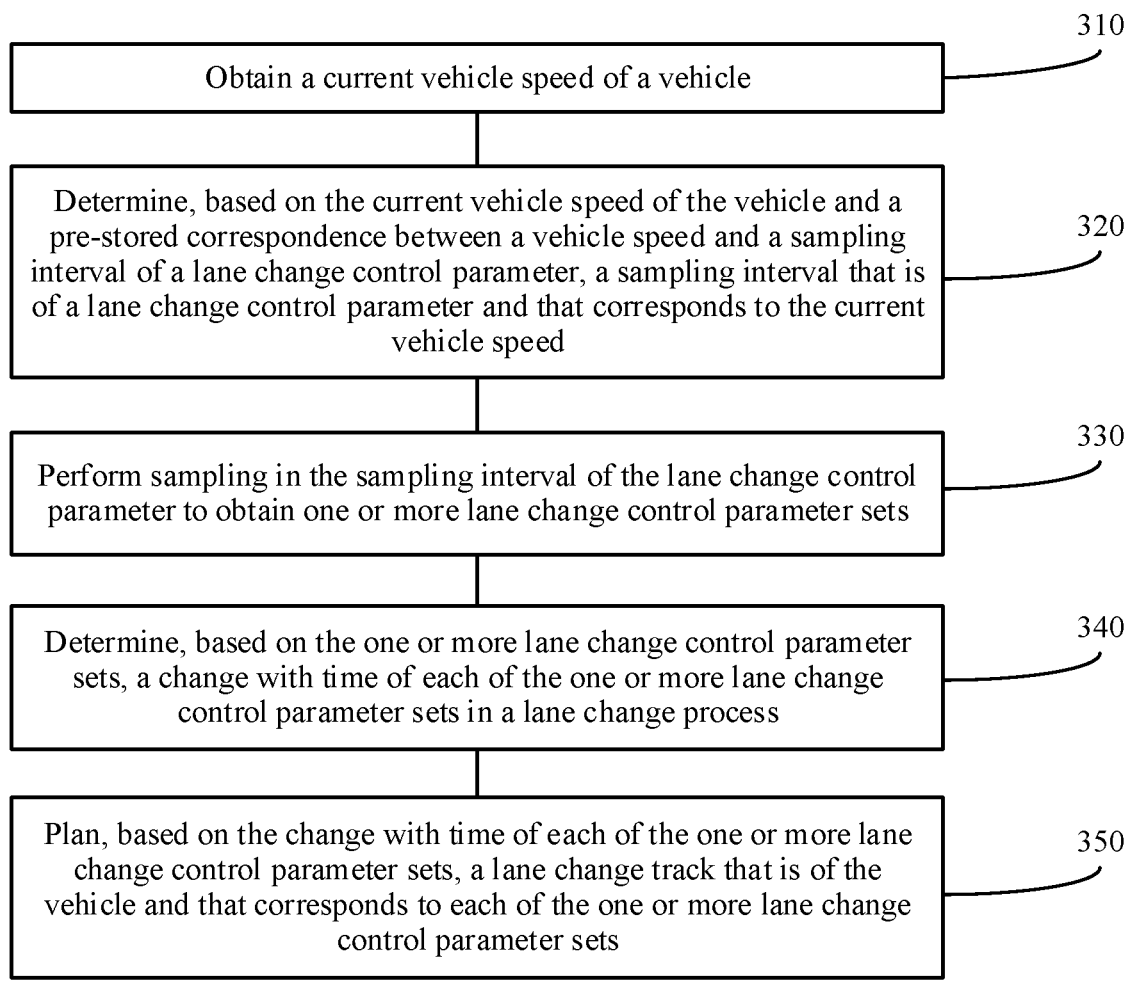
FIG. 3 is a flowchart of a lane change track planning method according to an embodiment of this application.

The following describes a lane change track planning method in an embodiment of this application with reference to FIG. 3. The method shown in FIG. 3 may be performed by the foregoing route control system 142, or may be performed by another apparatus having a calculation function. This is not limited in this embodiment of this application. The method shown in FIG. 3 includes step 310 to step 350.

310: Obtain a current vehicle speed of a vehicle.

The current vehicle speed may be an actual vehicle speed of the vehicle. Certainly, to improve safety of the vehicle of joining a target lane, the current vehicle speed may alternatively be a vehicle speed adjusted based on a vehicle speed of another vehicle traveling on the target lane. For example, the current vehicle speed may be obtained through adjustment based on a vehicle speed of a target vehicle that is in the target lane and that is closest to a longitudinal distance of the vehicle. For another example, the current vehicle speed may be obtained through adjustment based on a vehicle speed of a target vehicle that is in the target lane and that has a minimum difference from the vehicle speed of the vehicle.

Figure 4:
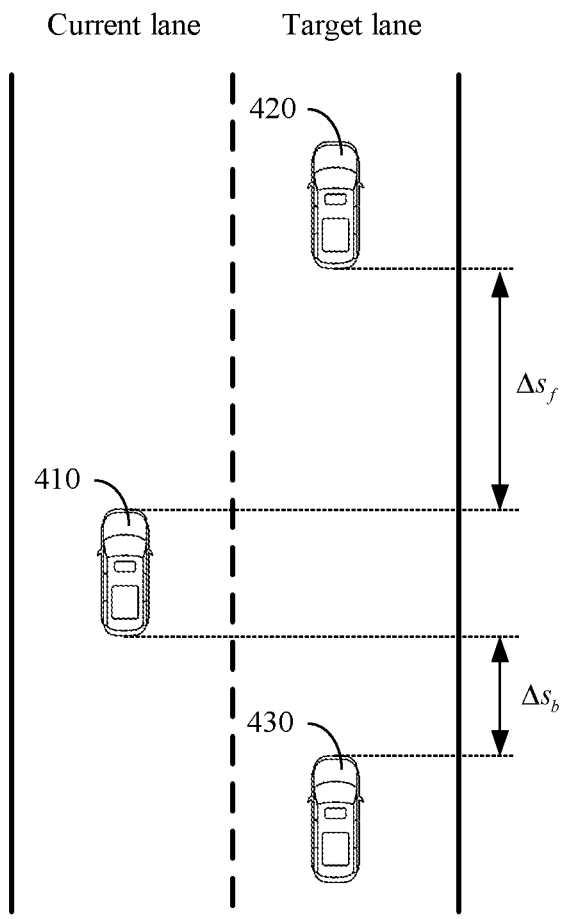
FIG. 4 is a schematic diagram of a location relationship between a vehicle and a target vehicle according to an embodiment of this application.

The following describes a method for adjusting a vehicle speed of a vehicle according to an embodiment of this application with reference to FIG. 4. FIG. 4 is a schematic diagram of a location relationship between a vehicle and a target vehicle according to an embodiment of this application.

It is assumed that a vehicle 410 needs to change from a current lane to a target lane, vehicles traveling in the target lane include a target vehicle 420 and a target vehicle 430, and the target vehicle 420 and the target vehicle 430 are vehicles that are in the target lane and that are closest to a longitudinal distance of the vehicle 410. A vehicle speed of the vehicle 410 is $v_{ego}$, a vehicle speed of the target vehicle 420 is $v_f$, a vehicle speed of the target vehicle 430 is $v_b$, a longitudinal distance between the vehicle 410 and the target vehicle 420 is $\Delta s_f$, and a longitudinal distance between the vehicle 410 and the target vehicle 430 is $\Delta s_b$.

When $v_{ego} < v_b$, time to collision (time to collision, TTC) $TTC_1$ between the vehicle 410 and the target vehicle 430 is $$TTC_1 = \frac{\Delta s_b}{v_b - v_{ego}}.$$

If $TTC_1 < TTC_{THRESHOLD1}$, after the vehicle 410 needs to accelerate to a speed higher than a first TTC threshold $TTC_{THRESHOLD1}$, the speed higher than the first TTC threshold is used as a current vehicle speed of the vehicle 410.

When $v_{ego} > v_b$, the time to collision $TTC_2$ between the vehicle 410 and the target vehicle 420 is $$TTC_2 = \frac{\Delta s_f}{v_{ego} - v_f}.$$

If $TTC_2 < TTC_{THRESHOLD2}$, the vehicle 410 needs to decelerate, and adjusts the vehicle speed to meet conditions of the first TTC threshold and the second TTC threshold. In this case, adjusted vehicle speed may be used as the current vehicle speed of the vehicle 410.

It should be noted that the first TTC threshold and the second TTC threshold may be different preset time to collision.

320: Determine, based on the current vehicle speed of the vehicle and a preset correspondence between a vehicle speed and a sampling interval of a lane change control parameter, a sampling interval that is of a lane change control parameter and that corresponds to the current vehicle speed, where the lane change control parameter includes at least two of a steering wheel rotation angle of the vehicle, a steering wheel rotation speed of the vehicle, and a course angle deviation of the vehicle, and the course angle deviation of the vehicle is used to indicate a degree of change between a current course angle of the vehicle and a course angle of the vehicle in a lane change process.

The sampling interval is also referred to as a "sampling interval of a control domain". In other words, a control parameter obtained by performing sampling in the sampling interval of the control domain may be directly used as a parameter for controlling a lane change track of the vehicle, to improve efficiency of planning the lane change track of the vehicle.

The correspondence between the vehicle speed and the sampling interval of the lane change control parameter may be understood as a value range of allowed lane change control parameters of the vehicle at different vehicle speeds. For example, when the lane change control parameter is the steering wheel rotation angle, the correspondence between the vehicle speed and the sampling interval of the lane change control parameter may indicate a value range of steering wheel rotation angles that are allowed at different vehicle speeds. For another example, when the lane change control parameter is the steering wheel rotation speed, the correspondence between the vehicle speed and the sampling interval of the lane change control parameter may indicate a value range of steering wheel rotation speeds that are allowed at different vehicle speeds. For another example, when the lane change control parameter is the course angle deviation, the correspondence between the vehicle speed and the sampling interval of the lane change control parameter may indicate a value range of course angle deviations that are allowed at different vehicle speeds.

In some embodiments, the lane change control parameter may be obtained through fitting based on data in a driving experience database. The driving experience database may include at least two correspondences in a sampling interval of steering wheel rotation angles corresponding to different vehicle speeds, a sampling interval of steering wheel rotation speeds corresponding to different vehicle speeds, or a sampling interval of course angle deviations corresponding to different vehicle speeds. The following separately describes correspondences between sampling intervals of the foregoing three lane change control parameters and vehicle speeds in embodiments of this application with reference to FIG. 5 to FIG. 7.

If the lane change control parameter includes the steering wheel rotation angle, the vehicle speed and the sampling interval of the steering wheel rotation angle may be represented by using a correspondence between a vehicle speed and a maximum steering wheel rotation angle, and the correspondence between the vehicle speed and the maximum steering wheel rotation angle is used to indicate a maximum steering wheel rotation angle allowed by the vehicle at different vehicle speeds.

In this case, step 320 includes determining, based on the pre-stored correspondence between the vehicle speed and the maximum steering wheel rotation angle, a maximum steering wheel rotation angle corresponding to the current vehicle speed; and determining a sampling interval of a steering wheel rotation angle corresponding to the current vehicle speed, where a steering wheel rotation angle included in the sampling interval of the steering wheel rotation angle is less than the maximum steering wheel rotation angle corresponding to the current vehicle speed.

For the sampling interval that is of the steering wheel rotation angle and that corresponds to the current vehicle speed, any angle smaller than the maximum steering wheel rotation angle corresponding to the current vehicle speed may be used as a lower limit of the sampling interval, and the maximum steering wheel rotation angle corresponding to the current vehicle speed may be used as an upper limit of the sampling interval. For example, 0 may be used as the lower limit of the sampling interval, and the maximum steering wheel rotation angle corresponding to the current vehicle speed may be used as the upper limit of the sampling interval.

Figure 5:
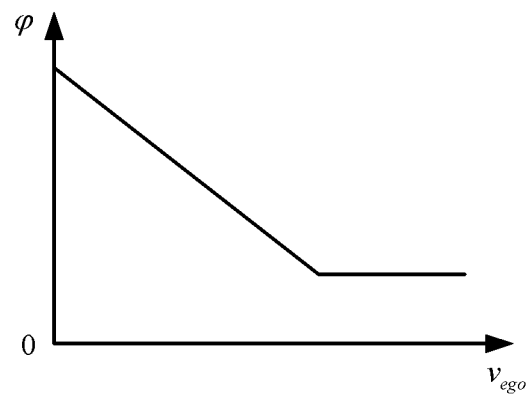
FIG. 5 is a schematic diagram of a correspondence between a vehicle speed and a maximum steering wheel rotation angle according to an embodiment of this application.

FIG. 5 shows a correspondence between a vehicle speed and a maximum steering wheel rotation angle according to an embodiment of this application. As shown in FIG. 5, a maximum steering wheel rotation angle of a vehicle is related to a vehicle speed. When the vehicle speed is high, if a steering wheel rotation angle of the steering wheel is large, driving safety of the vehicle is low. Therefore, in the correspondence shown in FIG. 5, a higher vehicle speed indicates a smaller allowed maximum steering wheel rotation angle. For example, when a vehicle speed $v_{ego}$ is 0, a corresponding maximum steering wheel rotation angle φ is the largest in steering wheel rotation angles corresponding to a plurality of vehicle speeds.

If the lane change control parameter includes the steering wheel rotation speed, the correspondence between the vehicle speed and the sampling interval of the lane change control parameter is represented by using a correspondence between a vehicle speed and a maximum steering wheel rotation speed, and the correspondence between the vehicle speed and the maximum steering wheel rotation speed is used to indicate a maximum steering rotation speed allowed by the vehicle at different vehicle speeds.

In this case, step 320 includes determining, based on the pre-stored correspondence between the vehicle speed and the maximum steering wheel rotation speed, a maximum steering wheel rotation speed corresponding to the current vehicle speed; and determining a sampling interval of a steering wheel rotation speed corresponding to the current vehicle speed, where a steering wheel rotation speed included in the sampling interval of the steering wheel rotation speed is less than the maximum steering wheel rotation speed corresponding to the current vehicle speed.

For the sampling interval of the steering wheel rotation speed corresponding to the current vehicle speed, any rotation speed lower than the maximum steering wheel rotation speed corresponding to the current vehicle speed may be used as a lower limit of the sampling interval, and the maximum steering wheel rotation speed corresponding to the current vehicle speed may be used as an upper limit of the sampling interval. For example, 0 may be used as the lower limit of the sampling interval, and the maximum steering wheel rotation speed corresponding to the current vehicle speed may be used as the upper limit of the sampling interval.

Figure 6:
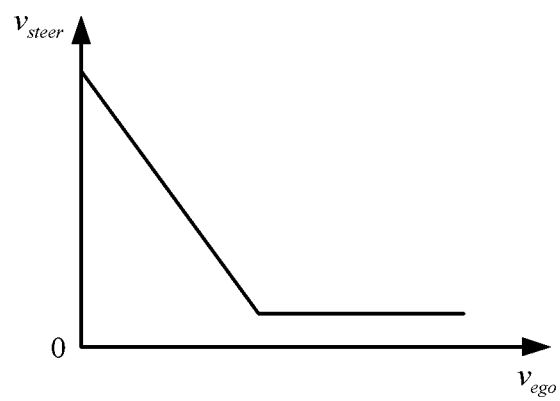
FIG. 6 is a schematic diagram of a correspondence between a vehicle speed and a maximum steering wheel rotation speed according to an embodiment of this application.

FIG. 6 shows a correspondence between a vehicle speed and a maximum steering wheel rotation speed according to an embodiment of this application. As shown in FIG. 6, a maximum steering wheel rotation speed of a vehicle is related to a vehicle speed. When the vehicle speed is high, if a steering wheel rotation speed of the steering wheel is high, driving safety of the vehicle is low. Therefore, in the correspondence shown in FIG. 6, a higher vehicle speed indicates a lower allowed maximum steering wheel rotation speed. For example, when a vehicle speed $v_{ego}$ is 0, a corresponding maximum steering wheel rotation speed $v_{steer}$ is the highest in steering wheel rotation speeds corresponding to a plurality of vehicle speeds.

If the lane change control parameter includes the course angle deviation, the correspondence between the vehicle speed and the sampling interval of the lane change control parameter is represented by using a correspondence between a vehicle speed and a maximum course angle deviation, and the correspondence between the vehicle speed and the maximum course angle deviation is used to indicate a maximum course angle deviation allowed by the vehicle at different vehicle speeds.

In this case, step 320 includes determining, based on the pre-stored correspondence between the vehicle speed and the maximum course angle deviation, a maximum course angle deviation corresponding to the current vehicle speed; and determining a sampling interval of a course angle deviation corresponding to the current vehicle speed, where a course angle deviation included in the sampling interval of the course angle deviation is less than the maximum course angle deviation corresponding to the current vehicle speed.

For the sampling interval of the maximum course angle deviation corresponding to the current vehicle speed, any angle smaller than the maximum course angle deviation corresponding to the current vehicle speed may be used as a lower limit of the sampling interval, and the maximum steering wheel rotation angle corresponding to the current vehicle speed may be used as an upper limit of the sampling interval. For example, 0 may be used as the lower limit of the sampling interval, and the maximum course angle deviation corresponding to the current vehicle speed may be used as the upper limit of the sampling interval.

Figure 7:
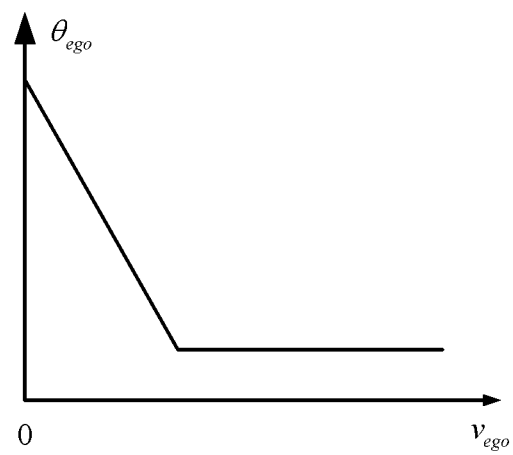
FIG. 7 is a schematic diagram of a correspondence between a vehicle speed and a maximum course angle deviation according to an embodiment of this application.

FIG. 7 shows a correspondence between a vehicle speed and a maximum course angle deviation according to an embodiment of this application. As shown in FIG. 7, a maximum course angle deviation of a vehicle is related to a vehicle speed. When the vehicle speed is high, if the maximum course angle deviation of the vehicle is large, driving safety of the vehicle is low. Therefore, in the correspondence shown in FIG. 7, a higher vehicle speed indicates a smaller allowed maximum course angle deviation. For example, when a vehicle speed $v_{ego}$ is 0, a corresponding maximum course angle deviation $\theta_{ego}$ is the largest in maximum course angle deviations corresponding to a plurality of vehicle speeds.

330: Perform sampling in the sampling interval of the lane change control parameter to obtain one or more lane change control parameter sets.

Each of the foregoing one or more lane change control parameter sets includes at least two lane change control parameters, and sampling values of at least one lane change control parameter included in different lane change control parameter sets are different.

It should be understood that the sampling may be performed, based on a preset step, in the sampling interval corresponding to the lane change control parameter. Sampling steps corresponding to the lane change control parameters may be the same or may be different. This is not limited in this embodiment of this application.

In addition, in this embodiment of this application, a quantity of sampling points corresponding to different types of lane change control parameters may be different or may be the same. This is not limited in this embodiment of this application.

For example, assume that the maximum steering wheel rotation angle corresponding to the current vehicle speed is $\varphi_{max}$, sampling is performed on the sampling interval $(-\varphi_{max}, \varphi_{max})$ of the steering wheel rotation angle to obtain a steering wheel rotation angle sampling point $\varphi_{sample}$, $\varphi_{sample} \in (-\varphi_{max}, \varphi_{max})$, and the steering wheel rotation angle sampling point $\varphi_{sample}$ is used as the maximum steering wheel rotation angle in the lane change control parameter set.

For example, assume that the maximum steering wheel rotation speed corresponding to the current vehicle speed is $v_{steer\_max}$, sampling is performed on the sampling interval $(-v_{steer\_max}, v_{steer\_max})$ of the steering wheel rotation speed to obtain a steering wheel rotation speed sampling point $v_{steer\_sample}$, $v_{steer\_sample} \in (-v_{steer\_max}, v_{steer\_max})$, and the steering wheel rotation speed sampling point $v_{steer\_sample}$ is used as the maximum steering wheel rotation speed in the lane change control parameter set.

For example, assume that the maximum steering wheel rotation angle corresponding to the current vehicle speed is $\varphi_{max}$, sampling is performed on the sampling interval of the steering wheel rotation angle to obtain a steering wheel rotation angle sampling point $\theta_{sample}$, $\varphi_{sample} \in (-\varphi_{max}, \varphi_{max})$, and the steering wheel rotation angle sampling point $\varphi_{sample}$ is used as the maximum steering wheel rotation angle in the lane change control parameter set.

340: Determine, based on the one or more lane change control parameter sets, a change with time of each of the one or more lane change control parameter sets in the lane change process.

Usually, in the lane change process, the steering wheel rotation angle and the course angle deviation of the vehicle change with time. However, the steering wheel rotation speed in the lane change process may be usually a constant value, that is, in the lane change process, the vehicle always rotates based on the steering wheel rotation speed in the lane change control parameter set.

In the lane change process, the steering wheel rotation angle and the course angle deviation of the vehicle change with time. To ensure safety of the vehicle, the steering wheel rotation angle needs to be constrained, so that the steering wheel rotation angle in the lane change process is less than the maximum steering wheel rotation angle in the lane change control parameter set, and the course angle deviation of the vehicle also needs to be constrained, so that the course angle deviation of the vehicle in the lane change process is less than the maximum course angle deviation in the lane change control parameter set.

In some embodiments, step 340 includes: determining, based on a steering wheel rotation angle in each of the one or more lane change control parameter sets and a preset change trend of the steering wheel rotation angle with time, a change amount of a steering wheel rotation angle that needs to be executed by the vehicle in each segment of the change trend; and calculating, based on the change amount that is of the steering wheel rotation angle and that corresponds to each segment of the change trend and each lane change control parameter, time required by the vehicle to complete each segment of the change trend in the change trend, to obtain the change with time of each lane change control parameter set.

To simplify the foregoing process of calculating the change with time of each lane change control parameter set, it may be assumed that a process in which the steering wheel rotation angle changes with time in the lane change process is a symmetric process. In some embodiments, the process in which the steering wheel rotation angle changes with time in an entire lane change process may be divided into seven time periods, that is, the foregoing preset change trend of the steering wheel rotation angle with time may include seven time periods. The change trend of the steering wheel rotation angle with time in an embodiment of this application is described below with reference to FIG. 8.

Figure 8:
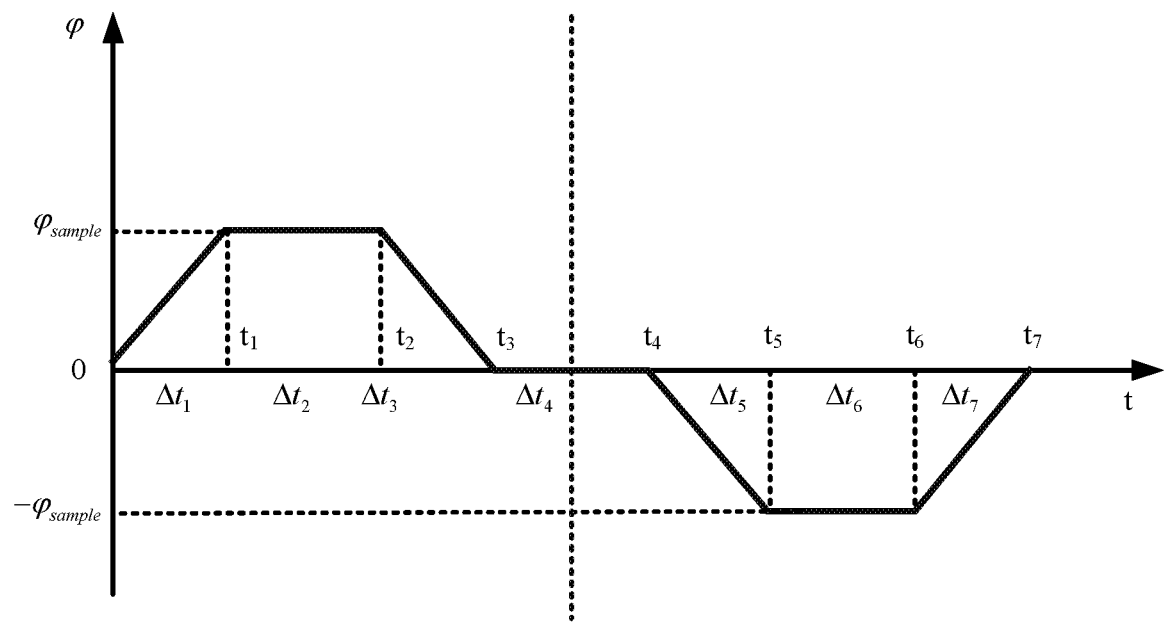
FIG. 8 is a schematic diagram of a change trend of a steering wheel rotation angle with time according to an embodiment of this application.

FIG. 8 is a schematic diagram of a change trend of a steering wheel rotation angle with time according to an embodiment of this application. In the change trend shown in FIG. 8, a $0^{th}$ moment is used as a start moment of a lane change process, a $t_7$ moment is used as an end moment of the lane change process, and a first time period to a seventh time period are included in total. The first time period uses the $0^{th}$ moment as a start moment and uses a $t_1$ moment as an end moment, and a time length of the first time period is represented by $\Delta t_1$. The second time period uses the $t_1$ moment as a start moment and uses a $t_2$ moment as an end moment, and a time length of the second time period is represented by $\Delta t_2$. The third time period uses the $t_2$ moment as a start moment, uses a $t_3$ moment as an end moment, and a time length of the third time period is represented by $\Delta t_3$. The fourth time period uses the $t_3$ moment as a start moment, uses a $t_4$ moment as an end moment, and a time length of the fourth time period is represented by $\Delta t_4$. The fifth time period uses the $t_4$ moment as a start moment, uses a $t_5$ moment as an end moment, and a time length of the fifth time period is represented by $\Delta t_5$. The sixth time period uses the $t_5$ moment as a start moment, uses a $t_6$ moment as an end moment, and a time length of the sixth time period is represented by $\Delta t_6$. The seventh time period uses the $t_6$ moment as a start moment and uses a $t_7$ moment as an end moment, and a time length of the seventh time period is represented by $\Delta t_7$. To simplify the calculation process, it is assumed that $\Delta t_1 = \Delta t_3 = \Delta t_5 = \Delta t_7$. In addition, it can be learned from FIG. 8 that at the $t_3$ moment, the course angle deviation of the vehicle reaches a maximum value $\theta_{sample}$.

Based on the change trend shown in FIG. 8, the following describes a process of solving a lane change track. The process of calculating the lane change track may be divided into three processes: (1) coordinate system conversion; (2) a process of solving each time segment in the change trend; and (3) a process of generating the lane change track. The following separately describes the foregoing three processes.

(1) Coordinate system conversion is performed. To subsequently plan the lane change track based on the lane change control parameter (the steering wheel rotation angle, the course angle deviation, and the like), parameters of the vehicle in an XY coordinate system are first converted into a Frenet Frame (Frenet Frame, S-L) coordinate system.

In this case, a speed component $\dot{d}$ of the vehicle in an L direction in the S-L coordinate system is $d=v_x \sin \Delta\theta$, and $v_x=v_{ego} \tan(\delta_k)$ and $\Delta\theta=\theta_x-\theta_r$. $v_x$ represents a speed component of a vehicle speed of the vehicle in an X-axis direction, $\delta_k$ represents a rotation angle of a front wheel of the vehicle, $v_{ego}$ represents a linear speed of the vehicle, $\theta_x$ represents a course angle of the vehicle in the XY coordinate system, and $\theta_r$ represents a course angle of the vehicle in the S-L coordinate system.

A speed component $\dot{s}$ of the vehicle in an S direction in the S-L coordinate system is $$\dot{s} = \frac{v_x \cdot \cos(\Delta\theta)}{1 - \kappa_r d},$$

$\kappa_r$ represents curvature corresponding to points in the lane change track, and d represents displacement of the vehicle in the L direction.

It should be noted that an interval between the points may be preset. This is not limited in this embodiment of this application.

(2) The process of solving each time segment in the change trend is performed. Time lengths corresponding to the seven time periods shown in FIG. 8 are solved by using this process.

As described above, assume that $\Delta t_1 = \Delta t_3 = \Delta t_5 = \Delta t_7$, $$\Delta t_1 = \Delta t_3 = \Delta t_5 = \Delta t_7 = \frac{\varphi_{sample}}{v_{steer\_sample}}.$$

As shown in FIG. 7, the course angle deviation of the vehicle reaches the maximum value $\theta_{sample}$ at the $t_3$ moment. The time length $\Delta t_2$ of the second time period needs to be determined based on a course angle deviation completed by the vehicle in the second time period. The course angle deviation completed by the vehicle in the second time period may be represented by $\theta_{t_2} - \theta_{t_1}$, $\theta_{t_2}$ represents a course angle deviation of the vehicle at the second moment, and $\theta_{t_1}$ represents a course angle deviation of the vehicle at the first moment.

Based on a relationship between an angle and an angular speed, $$\theta_{t_1} = \theta_{t_0} + \sum_{t_0}^{t_1} \frac{v_{ego} \cdot \tan(\delta_i)}{L} \cdot \Delta_{t_i}$$

may be obtained, and $$\theta_{t_2} = \theta_{t_3} - \sum_{t_2}^{t_3} \frac{v_{ego} \cdot \tan(\delta_i)}{L} \cdot \Delta_{t_i}, \theta_{t_0}$$

represents a course angle deviation of the vehicle at the $0^{th}$ moment, $\delta_i$ represents a rotation angle of the front wheel of the vehicle at an $i^{th}$ moment, and L represents an axis distance from a front axle center of the vehicle to a rear axle center.

Because the steering wheel rotation angle of the vehicle does not change in the second time period, the rotation angle of the front wheel of the vehicle also remains unchanged. In this case, the time length $\Delta t_2$ of the second time period is $$\Delta t_2 = \frac{\theta_{t_2} - \theta_{t_1}}{\frac{v_{ego} \cdot \tan(\delta_{t_1 t_2})}{L}},$$

and $\delta_{t_1 t_2}$ represents an angle of the front wheel of the vehicle in the first time period.

As described above, because the change trend shown in FIG. 8 is a symmetric process, the time length of the sixth time period is equal to the time length of the second time period, that is, $\Delta t_6 = \Delta t_2$.

Because the vehicle needs to change from a current lane to a target lane in the fourth time period, transverse displacement of the vehicle in the lane change process is closely related to the time length of the fourth time period. Transverse displacement that needs to be completed by the vehicle in the fourth time period needs to be determined based on transverse displacement reached by the vehicle in the third time period and a location of the vehicle in the target lane at the end of the lane change.

A transverse speed (that is, a speed projection in the L direction) at each moment from the $0^{th}$ moment $t_0$ to the third moment $t_3$ in the S-L coordinate system may be obtained based on a dynamic model of the vehicle and the following formulas: $x_{k+1} = x_k + v_{egok} \cdot \cos(\delta_k) \cdot \Delta t$; $y_{k+1} = y_k + v_{egok} \cdot \sin(\delta_k) \cdot \Delta t$;

$$\theta_{xk+1} = \theta_{xk} + \frac{v_{egok} \cdot \tan(\delta_k)}{L} \cdot \Delta t;$$

$v_{ego\_k+1} = v_{ego\_k} \cdot \cos(\theta_{xk+1})$; $\varphi_{k+1} = \min(\varphi_k + v_{steer} \cdot \Delta t, \varphi_{sample})$; $\varphi_k = k' \cdot \delta_k$; $s_{k+1} = s_k + \dot{s} \cdot \Delta t$ and $d_{k+1} = d_k + \dot{d} \cdot \Delta t$. $v_{ego\_k}$ represents a linear speed of the vehicle at a $k^{th}$ moment, $\bar{\delta}_k$ represents a rotation angle of the front wheel of the vehicle at the $k^{th}$ moment, $(x_k, y_k)$ represents coordinates of the vehicle at the $k^{th}$ moment in the XY coordinate system, $\theta_{xk}$ represents a deviation of a course angle between the vehicle and the X axis at the $k^{th}$ moment, $v_{xk}$ represents a speed of the vehicle in the X-axis direction at the $k^{th}$ moment, $v_{steer}$ represents the steering wheel rotation speed of the steering wheel, $\varphi_k$ represents a steering wheel rotation angle of the steering wheel at the $k^{th}$ moment, $\varphi_{sample}$ represents the maximum steering wheel rotation angle of the vehicle, $\dot{s}$ represents a longitudinal speed of the vehicle in the S-L coordinate system, S represents longitudinal displacement of the vehicle in the S-L coordinate system, $\dot{d}$ represents a transverse speed of the vehicle in the S-L coordinate system, d represents transverse displacement of the vehicle in the S-L coordinate system, and k' represents a proportional relationship between the steering wheel rotation angle of the vehicle and the rotation angle of the front wheel of the vehicle.

In this case, in the S-L coordinate system, transverse displacement $d_{t_3}$ of the vehicle at the third moment $t_3$ is $$d_{t_3} = d_{t_0} + \sum_{t_0}^{t_1} \dot{d} \Delta_{t_k} + \sum_{t_1}^{t_2} \dot{d} \Delta_{t_k} + \sum_{t_2}^{t_3} \dot{d} \Delta_{t_k},$$

and $d_{t_0}$ represents transverse displacement of the vehicle at the $0^{th}$ moment in the S-L coordinate system.

Further, the time length $\Delta_{t_4}$ of the fourth time period may be deduced as $$\Delta_{t_k} = 2 \times \frac{D - d_{t_3}}{\dot{d}},$$

where D represents a half of the transverse displacement of the vehicle from the current lane to the target lane in the lane change process.

It should be noted that the foregoing change trend is not limited in this embodiment of this application. In addition to the change trend shown in FIG. 7, the foregoing change trend may be another change curve, for example, may be a change trend similar to a sin curve.

350: Plan, based on the change with time of each of the one or more lane change control parameter sets, a lane change track that is of the vehicle and that corresponds to each of the one or more lane change control parameter sets. Each lane change control parameter corresponds to one lane change track.

In this embodiment of this application, because the lane change control parameter in the foregoing control parameter set is selected based on the current speed of the vehicle, when the current speed of the vehicle is high, the sampling interval corresponding to the lane change control parameter is small, and correspondingly, the sampling points obtained through sampling in the sampling interval may also be reduced. Therefore, the method in this embodiment of this application further helps reduce the quantity of sampling points of the lane change control parameter, to reduce a calculation amount required for planning the lane change track.

Usually, a lane change track (also referred to as a first lane change track) may be selected, based on one or more aspects of safety, comfort, and efficiency of the lane change track, from a plurality of lane change tracks corresponding to the plurality of lane change control parameter sets, and may be used as the lane change track when the vehicle changes a lane. Certainly, alternatively, a lane change track may be randomly selected from the plurality of lane change tracks as the lane change track when the vehicle changes the lane. This is not limited in this embodiment of this application.

With reference to the foregoing three aspects, the following describes a cost function used for lane change track evaluation in this embodiment of this application.

For the safety of the lane change track, a dynamic obstacle and/or a static obstacle are/is an important factor affecting the safety of the lane change track. Therefore, the safety of the lane change track may be evaluated based on a cost of the dynamic obstacle and/or a cost of the static obstacle.

In some embodiments, a lane change track safety cost function based on the dynamic obstacle may be calculated by using a formula $$C_{obs}^d = \sum_{i=0}^{n} d_i.$$

n represents a total quantity of track points on a lane change track of the plurality of lane change tracks, $c_{obs}^d$ represents a safety cost calculated based on a dynamic obstacle in the lane change track, and $d_i$ represents a cost of a distance between an $i^{th}$ track point on the lane change track and the dynamic obstacle. A shorter distance between the $i^{th}$ track point and the dynamic obstacle indicates a larger value of $d_i$. For example, when the distance between the $i^{th}$ track point and the dynamic obstacle is 0, a collision occurs, and the value of $d_i$ may be infinite.

In some embodiments, a lane change track safety cost function based on the static obstacle may be calculated by using a formula $$C_{obs}^s = \sum_{i=0}^{n} s_i.$$

n represents a total quantity of track points on a lane change track of the plurality of lane change tracks, $C_{obs}^s$ represents a safety cost calculated based on a static obstacle in the lane change track, and $s_i$ represents a cost of a distance between an $i^{th}$ track point on the lane change track and the static obstacle. A shorter distance between the $i^{th}$ track point and the static obstacle indicates a larger value of $s_i$. For example, when the distance between the $i^{th}$ track point and the static obstacle is 0, a collision occurs, and the value of $s_i$ may be infinite.

For the comfort of the lane change track, the steering wheel rotation angle of the steering wheel of the vehicle in the lane change process is one of important factors that affect the comfort of the lane change track. Therefore, the comfort of the lane change track may be evaluated based on a cost of the steering wheel rotation angle of the steering wheel.

In some embodiments, a cost function used to evaluate the comfort of the lane change track may be calculated by using a formula $$C_\delta = \sum_{i=1}^{n} |\delta_i|.$$

$C_\delta$ represents a cost used to evaluate comfort of a lane change track of the plurality of lane change tracks, n represents a total quantity of track points on the lane change track, and $\delta_i$ represents a change amount between a steering wheel rotation angle of the steering wheel corresponding to an $(i-1)^{th}$ track point on the lane change track and a steering wheel rotation angle of the steering wheel corresponding to an $i^{th}$ track point.

For the lane change efficiency of the lane change track, lane change completion time is one of important factors that affect the lane change efficiency of the lane change track. Therefore, the lane change efficiency of the lane change track may be evaluated based on a cost of the lane change completion time.

In some embodiments, a cost function used to evaluate the lane change efficiency of the lane change track may be calculated by using a formula $$C_t = \begin{cases} k_1(t - t_1), & (t_1 < t < t_2) \\ k_2(t - t_1), & (t > t_2) \\ k_2(t_2 - t), & (t < t_1) \end{cases} \cdot k_1$$

and $k_2$ represent preset cost coefficients, t represents a lane change completion time of a lane change track of the plurality of lane change tracks, and $[t_1, t_2]$ represents a preset ideal lane change completion time interval.

In conclusion, if the lane change track is evaluated from three aspects: safety, comfort, and efficiency, a total cost corresponding to the foregoing lane change track may be calculated by using a formula $C = w_1 \cdot C_{obs}^d + w_2 \cdot C_{obs}^s + w_3 \cdot C_\delta + w_4 \cdot C_t$. $w_1$, $w_2$, $w_3$, and $w_4$ are preset cost adjustment coefficients.

It should be noted that the track point in the lane change track may be collected on the lane change track based on a preset step, or may be collected on the lane change track based on a preset time interval. This is not limited in this embodiment of this application.

The foregoing describes the lane change track planning method in embodiments of this application with reference to FIG. 1 to FIG. 8. The following describes an apparatus in embodiments of this application with reference to FIG. 9 and FIG. 10. It should be understood that, it should be noted that the apparatus shown in FIG. 9 and FIG. 10 may implement the steps in the foregoing method. For brevity, details are not described herein again.

Figure 9:
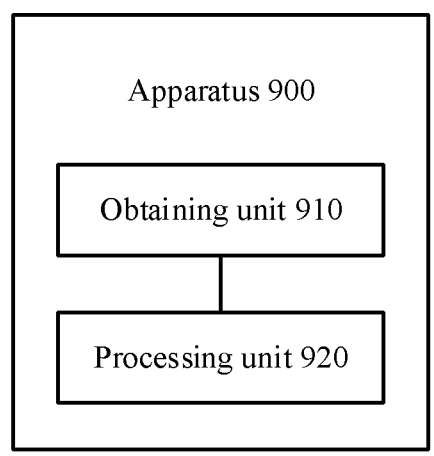
FIG. 9 is a schematic diagram of a lane change track planning apparatus according to an embodiment of this application.

FIG. 9 is a schematic diagram of a lane change track planning apparatus according to an embodiment of this application. An apparatus 900 shown in FIG. 9 includes an obtaining unit 910 and a processing unit 920.

The obtaining unit 910 is configured to obtain a current vehicle speed of a vehicle.

The processing unit 920 is configured to determine, based on the current vehicle speed of the vehicle and a preset correspondence between a vehicle speed and a sampling interval of a lane change control parameter, a sampling interval that is of a lane change control parameter and that corresponds to the current vehicle speed. The lane change control parameter includes at least two of a steering wheel rotation angle of the vehicle, a steering wheel rotation speed of the vehicle, and a course angle deviation of the vehicle, and the course angle deviation of the vehicle is used to indicate a degree of change between a current course angle of the vehicle and a course angle of the vehicle in a lane change process.

The processing unit 920 is further configured to perform sampling in the sampling interval of the lane change control parameter to obtain one or more lane change control parameter sets, and the processing unit 920 is further configured to determine, based on the one or more lane change control parameter sets, a change with time of each of the one or more lane change control parameter sets in the lane change process.

The processing unit 920 is further configured to plan, based on the change with time of each of the one or more lane change control parameter sets, a lane change track that is of the vehicle and that corresponds to each of the one or more lane change control parameter sets.

In some embodiments, in an embodiment, if the lane change control parameter includes the steering wheel rotation angle, the correspondence between the vehicle speed and the sampling interval of the lane change control parameter is represented by using a correspondence between a vehicle speed and a maximum steering wheel rotation angle, and the correspondence between the vehicle speed and the maximum steering wheel rotation angle is used to indicate a maximum steering wheel rotation angle allowed by the vehicle at different vehicle speed. The processing unit 920 is further configured to determine, based on the pre-stored correspondence between the vehicle speed and the maximum steering wheel rotation angle, a maximum steering wheel rotation angle corresponding to the current vehicle speed, and the processing unit 920 is further configured to determine a sampling interval of a steering wheel rotation angle corresponding to the current vehicle speed, where a steering wheel rotation angle included in the sampling interval of the steering wheel rotation angle is less than the maximum steering wheel rotation angle corresponding to the current vehicle speed.

In some embodiments, in an embodiment, if the lane change control parameter includes the steering wheel rotation speed, the correspondence between the vehicle speed and the sampling interval of the lane change control parameter is represented by using a correspondence between a vehicle speed and a maximum steering wheel rotation speed, and the correspondence between the vehicle speed and the maximum steering wheel rotation speed is used to indicate a maximum steering rotation speed allowed by the vehicle at different vehicle speeds. The processing unit 920 is further configured to determine, based on the pre-stored correspondence between the vehicle speed and the maximum steering wheel rotation speed, a maximum steering wheel rotation speed corresponding to the current vehicle speed, and the processing unit 920 is further configured to determine a sampling interval of a steering wheel rotation speed corresponding to the current vehicle speed, where a steering wheel rotation speed included in the sampling interval of the steering wheel rotation speed is less than the maximum steering wheel rotation speed corresponding to the current vehicle speed.

In some embodiments, in an embodiment, if the lane change control parameter includes the course angle deviation, the correspondence between the vehicle speed and the sampling interval of the lane change control parameter is represented by using a correspondence between a vehicle speed and a maximum course angle deviation, and the correspondence between the vehicle speed and the maximum course angle deviation is used to indicate a maximum course angle deviation allowed by the vehicle at different vehicle speeds. The processing unit 920 is further configured to determine, based on the pre-stored correspondence between the vehicle speed and the maximum course angle deviation, a maximum course angle deviation corresponding to the current vehicle speed, and the processing unit 920 is further configured to determine a sampling interval of a course angle deviation corresponding to the current vehicle speed, where a course angle deviation included in the sampling interval of the course angle deviation is less than the maximum course angle deviation corresponding to the current vehicle speed.

In some embodiments, in an embodiment, if the lane change track that is of the vehicle and that corresponds to each of the plurality of lane change control parameter sets is a plurality of lane change tracks, the processing unit 920 is further configured to: calculate a change of a steering wheel rotation angle required when the vehicle changes a lane based on each of the plurality of lane change tracks, and/or lane change time required when the vehicle changes a lane based on each of the plurality of lane change tracks; and calculate the change of the steering wheel rotation angle and/or the lane change time, and select a first lane change track from the plurality of lane change tracks.

In some embodiments, in an embodiment, the processing unit 920 is further configured to determine, based on a steering wheel rotation angle in each of the one or more lane change control parameter sets and a preset change trend of the steering wheel rotation angle with time, a change amount of a steering wheel rotation angle that needs to be executed by the vehicle in each segment of the change trend, and the processing unit 920 is further configured to calculate, based on the change amount that is of the steering wheel rotation angle and that corresponds to each segment of the change trend and a lane change control parameter other than the steering wheel rotation angle in each lane change control parameter, time required by the vehicle to complete each segment of the change trend in the change trend, to obtain the change with time of each lane change control parameter set.

In an optional embodiment, the processing unit 920 may be a processor 1020, the obtaining module 910 may be a communications interface 1030, and the communication device may further include a memory 1010. Details are shown in FIG. 10.

Figure 10:
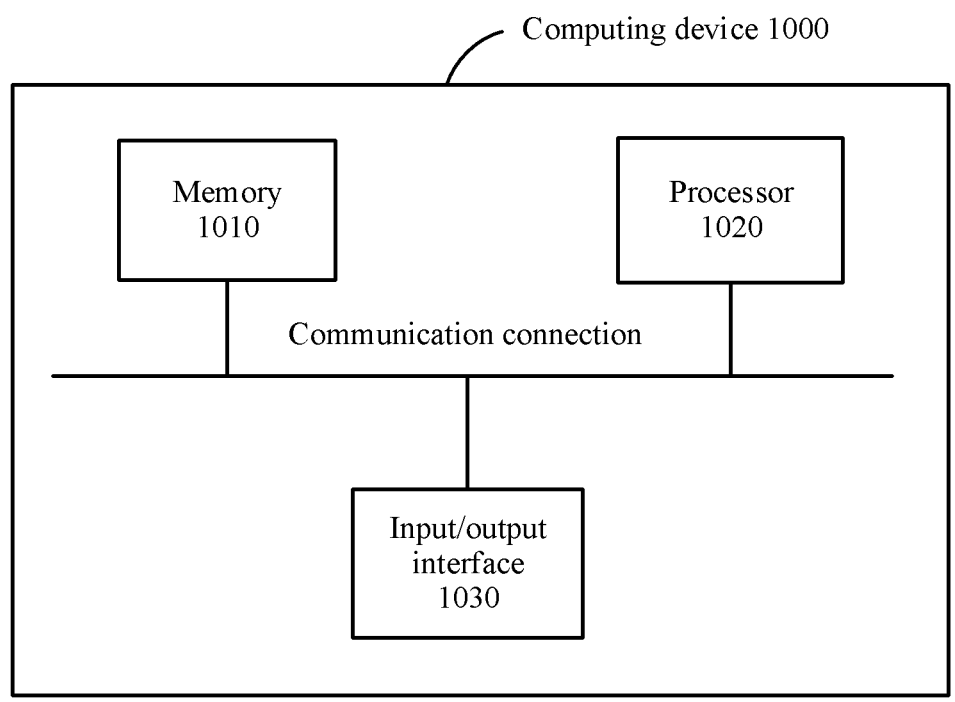
FIG. 10 is a schematic block diagram of a computing device according to another embodiment of this application.

FIG. 10 is a schematic block diagram of a computing device according to another embodiment of this application. A computing device 1000 shown in FIG. 10 may include a memory 1010, a processor 1020, and a communications interface 1030. The memory 1010, the processor 1020, and the communications interface 1030 are connected through an internal connection path. The memory 1010 is configured to store instructions. The processor 1020 is configured to execute the instructions stored in the memory 1020. In some embodiments, the memory 1010 may be coupled to the processor 1020 through an interface, or may be integrated with the processor 1020.

It should be noted that the communications interface 1030 implements communication between the communication device 1000 and another device or a communications network by using, for example but not limited to, a transceiver apparatus such as a transceiver. The communications interface 1030 may further include an input/output interface (input/output interface).

In an implementation process, the steps in the foregoing method may be performed by using a hardware integrated logical circuit in the processor 1020, or by using instructions in a form of software. The method disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register.

The storage medium is located in the memory 1010. The processor 1020 reads information from the memory 1010, and performs the steps of the foregoing method in combination with hardware of the processor. To avoid repetition, details are not described herein again.

It should be understood that, the processor in embodiments of this application may be a CPU, or may be another general-purpose processor, a digital signal processor (DSP), an ASIC, a field-programmable gate array (FPGA), or another programmable logic device, a discrete gate or transistor logic device, a discrete hardware component, or the like. The general-purpose processor may be a microprocessor, or the processor may be any conventional processor, or the like.

It should also be understood that in embodiments of this application, the memory may include a read-only memory (ROM) and a random-access memory (RAM), and provide instructions and data to the processor. A part of the processor may further include a non-volatile random access memory. For example, the processor may further store information of a device type.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lane change track planning method, comprising:
   obtaining a current vehicle speed of a vehicle;
   determining, based on the current vehicle speed and a preset correspondence between vehicle speed and sampling intervals of lane change control parameters, a first sampling interval that is of a first lane change control parameter and that corresponds to the current vehicle speed, wherein the first lane change control parameter comprises at least two of a steering wheel rotation angle of the vehicle, a steering wheel rotation speed of the vehicle, or a course angle deviation of the vehicle, and wherein the course angle deviation indicates a degree of change between a first current course angle of the vehicle and a second course angle of the vehicle in a lane change process;
   performing sampling in the first sampling interval of the first lane change control parameter to obtain at least one lane change control parameter set;
   determining, based on the at least one lane change control parameter set, a change with time of each of the at least one lane change control parameter set in the lane change process; and
   planning, based on the change with time of each of the at least one lane change control parameter set, a lane change track that is of the vehicle and that corresponds to each of the at least one lane change control parameter set.

2. The lane change track planning method of claim 1, wherein the preset correspondence is represented by a first correspondence between a vehicle speed and a maximum steering wheel rotation angle when the first lane change control parameter comprises the steering wheel rotation angle, wherein the first correspondence indicates a second maximum steering wheel rotation angle allowed by the vehicle at different vehicle speeds, and wherein determining the first sampling interval comprises:
 determining, based on the first correspondence, a third maximum steering wheel rotation angle corresponding to the current vehicle speed; and
 determining a second sampling interval of a second steering wheel rotation angle corresponding to the current vehicle speed, wherein the second steering wheel rotation angle is less than the third maximum steering wheel rotation angle corresponding to the current vehicle speed.

3. The lane change track planning method of claim 1, wherein the preset correspondence is represented using a first correspondence between a vehicle speed and a maximum steering wheel rotation speed when the lane change control parameter comprises the steering wheel rotation speed, wherein the first correspondence indicates a second maximum steering rotation speed allowed by the vehicle at different vehicle speeds, and wherein determining the first sampling interval comprises:
 determining, based on the first correspondence, a second maximum steering wheel rotation speed corresponding to the current vehicle speed; and
 determining a second sampling interval of a second steering wheel rotation speed corresponding to the current vehicle speed, wherein the second steering wheel rotation speed is less than the maximum steering wheel rotation speed corresponding to the current vehicle speed.

4. The lane change track planning method of claim 1, wherein the preset correspondence is represented by a first correspondence between a vehicle speed and a maximum course angle deviation when the first lane change control parameter comprises the course angle deviation, wherein the first correspondence indicates a second maximum course angle deviation allowed by the vehicle at different vehicle speeds, and wherein determining, the first sampling interval further comprises:
 determining, based on the first correspondence, a second maximum course angle deviation corresponding to the current vehicle speed; and
 determining a second sampling interval of a second course angle deviation corresponding to the current vehicle speed, wherein the second course angle deviation is less than the second maximum course angle deviation.

5. The lane change track planning method of claim 1, wherein when the lane change track is a plurality of lane change tracks, the lane change track planning method further comprises:
 calculating a change of a required steering wheel rotation angle when the vehicle changes a lane based on each of the lane change tracks; or calculating a required lane change time when the vehicle changes the lane based on each of the lane change tracks; and
 selecting a first lane change track from the lane change tracks.

6. The lane change track planning method of claim 1, wherein determining the change with time of each of the at least one lane change control parameter set in the lane change process comprises:
 determining, based on a second steering wheel rotation angle in each of the at least one lane change control parameter set and a preset change trend of the steering wheel rotation angle with time, a change amount of the steering wheel rotation angle that is to be executed by the vehicle in each segment of the preset change trend; and
 calculating, based on the change amount of the steering wheel rotation angle and that corresponds to the each segment of the preset change trend and a third lane change control parameter other than the second steering wheel rotation angle, time required by the vehicle to complete the each segment to obtain the change with time of each of the at least one lane change control parameter set.

7. A lane change track planning apparatus, comprising:
 a memory configured to store programming instructions; and
 a processor coupled to the memory and configured to execute the programming instructions to cause the lane change track planning apparatus to:
  obtain a current vehicle speed of a vehicle;
  determine, based on the current vehicle speed and a preset correspondence between a vehicle speed and a first sampling interval of a first lane change control parameter, a first sampling interval that is of a first lane change control parameter and that corresponds to the current vehicle speed, wherein the first lane change control parameter comprises at least two of a steering wheel rotation angle of the vehicle, a steering wheel rotation speed of the vehicle, or a course angle deviation of the vehicle, and wherein the course angle deviation of the vehicle indicates a degree of change between a first current course angle of the vehicle and a second course angle of the vehicle in a lane change process;
  perform sampling in the first sampling interval to obtain at least one lane change control parameter set;
  determine, based on the at least one lane change control parameter set, a change with time of each of the at least one lane change control parameter set in the lane change process; and
  plan, based on the change with time of each of the at least one lane change control parameter set, a lane change track that is of the vehicle and that corresponds to each of the at least one lane change control parameter set.

8. The lane change track planning apparatus of claim 7, wherein the preset correspondence is represented by a first correspondence between a vehicle speed and a maximum steering wheel rotation angle when the first lane change control parameter comprises the steering wheel rotation angle, wherein the first correspondence indicates a second maximum steering wheel rotation angle allowed by the vehicle at different vehicle speeds, and wherein the processor is configured to cause the lane change track planning apparatus to:
 determine, based on the first correspondence between the vehicle speed and the maximum steering wheel rotation angle, a third maximum steering wheel rotation angle corresponding to the current vehicle speed; and
 determine a second sampling interval of a second steering wheel rotation angle corresponding to the current vehicle speed, wherein the steering wheel rotation angle is less than the third maximum steering wheel rotation angle corresponding to the current vehicle speed.

9. The lane change track planning apparatus of claim 7, wherein the preset correspondence is represented by a first correspondence between a vehicle speed and a maximum steering wheel rotation speed when the lane change control parameter comprises the steering wheel rotation speed, wherein the first correspondence indicates a second maximum steering rotation speed allowed by the vehicle at different vehicle speeds, and wherein the processor is configured to cause the lane change track planning apparatus to:
  determine, based on the first correspondence, a second maximum steering wheel rotation speed corresponding to the current vehicle speed; and
  determine a second sampling interval of a second steering wheel rotation speed corresponding to the current vehicle speed, wherein the second steering wheel rotation speed is less than the maximum steering wheel rotation speed corresponding to the current vehicle speed.

10. The lane change track planning apparatus of claim 7, wherein the preset correspondence is represented by a first correspondence between a vehicle speed and a maximum course angle deviation when the first lane change control parameter comprises the course angle deviation, wherein the first correspondence indicates a second maximum course angle deviation allowed by the vehicle at different vehicle speeds, wherein the processor is configured to cause the lane change track planning apparatus to:
  determine, based on the first correspondence, a second maximum course angle deviation corresponding to the current vehicle speed; and
  determine a second sampling interval of a second course angle deviation corresponding to the current vehicle speed, wherein the second course angle deviation is less than the second maximum course angle deviation.

11. The lane change track planning apparatus of claim 7, wherein when the lane change track is a plurality of lane change tracks, the processor is configured to cause the lane change track planning apparatus to:
  calculate a change of a required steering wheel rotation angle when the vehicle changes a lane based on the plurality of lane change tracks; and
  selecting a first lane change track from the lane change tracks based on the change of the required steering wheel rotation angle.

12. The lane change track planning apparatus of claim 7, wherein the processor is configured to cause the lane change track planning apparatus to:
  determine, based on a second steering wheel rotation angle in each of the at least one lane change control parameter set and a preset change trend of the steering wheel rotation angle with time, a change amount of the steering wheel rotation angle that is to be executed by the vehicle in each segment of the preset change trend; and
  calculate, based on the change amount of the steering wheel rotation angle and that corresponds to the each segment of the preset change trend and a third lane change control parameter other than the second steering wheel rotation angle, time required by the vehicle to complete the each segment to obtain the change with time of each of the at least one lane change control parameter set.

13. The lane change track planning apparatus of claim 7, wherein when the lane change track is a plurality of lane change tracks, the processor is further configured to cause the lane change track planning apparatus to:
  calculate a required lane change time when the vehicle changes the lane based on each of the lane change tracks; and
  select a first lane change track from the lane change tracks based on the required lane change time.

14. A computer program product comprising computer-executable instructions that are stored on a non-transitory computer-readable storage medium and that, when executed by a processor, cause a lane change track planning apparatus to:
  obtain a current vehicle speed of a vehicle;
  determine, based on the current vehicle speed and a preset correspondence between vehicle speeds and sampling intervals of lane change control parameters, a first sampling interval that is of a first lane change control parameter and that corresponds to the current vehicle speed, wherein the first lane change control parameter comprises at least two of a steering wheel rotation angle of the vehicle, a steering wheel rotation speed of the vehicle, or a course angle deviation of the vehicle, and wherein the course angle deviation of the vehicle indicates a degree of change between a first current course angle of the vehicle and a second course angle of the vehicle in a lane change process;
  perform sampling in the first sampling interval to obtain at least one lane change control parameter set;
  determine, based on the at least one lane change control parameter set, a change with time of each of the at least one lane change control parameter set in the lane change process; and
  plan, based on the change with time of each of the at least one lane change control parameter set, a lane change track that is of the vehicle and that corresponds to each of the at least one lane change control parameter set.

15. The computer program product of claim 14, wherein the preset correspondence is represented by a first correspondence between a vehicle speed and a maximum steering wheel rotation angle when the first lane change control parameter comprises the steering wheel rotation angle, wherein the first correspondence indicates a second maximum steering wheel rotation angle allowed by the vehicle at different vehicle speeds, and wherein the computer-executable instructions cause the lane change track planning apparatus to:
  determine, based on the first correspondence, a third maximum steering wheel rotation angle corresponding to the current vehicle speed; and
  determine a second sampling interval of a second steering wheel rotation angle corresponding to the current vehicle speed, wherein the steering wheel rotation angle is less than the third maximum steering wheel rotation angle corresponding to the current vehicle speed.

16. The computer program product of claim 14, wherein the preset correspondence between the vehicle speed and the first sampling interval is represented by a first correspondence between a vehicle speed and a maximum steering wheel rotation speed when the lane change control parameter comprises the steering wheel rotation speed, wherein the first correspondence indicates a second maximum steering rotation speed allowed by the vehicle at different vehicle speeds, and wherein the computer-executable instructions cause the lane change track planning apparatus to:
  determine, based on the first correspondence, a second maximum steering wheel rotation speed corresponding to the current vehicle speed; and determine a second sampling interval of a second steering wheel rotation speed corresponding to the current vehicle speed, wherein the second steering wheel rotation speed is less than the maximum steering wheel rotation speed corresponding to the current vehicle speed.

17. The computer program product of claim 14, wherein the preset correspondence is represented by a first correspondence between a vehicle speed and a maximum course angle deviation when the first lane change control parameter comprises the course angle deviation, wherein the first correspondence indicates a second maximum course angle deviation allowed by the vehicle at different vehicle speeds, and wherein the computer-executable instructions cause the lane change track planning apparatus to:

determine, based on the first correspondence, a second maximum course angle deviation corresponding to the current vehicle speed; and determine a second sampling interval of a second course angle deviation corresponding to the current vehicle speed, wherein the second course angle deviation is less than the second maximum course angle deviation.

18. The computer program product of claim 14, wherein when the lane change track is a plurality of lane change tracks, the computer-executable instructions cause the lane change track planning apparatus to:

calculate a change of a required steering wheel rotation angle when the vehicle changes a lane based on the plurality of lane change tracks; and select a first lane change track from the lane change tracks based on the change of the required steering wheel rotation angle.

19. The computer program product of claim 14, wherein when the lane change track is a plurality of lane change tracks, the computer-executable instructions cause the lane change track planning apparatus to:

calculate a required lane change time when the vehicle changes the lane based on each of the lane change tracks; and select a first lane change track from the lane change tracks based on the required lane change.

20. The computer program product of claim 14, wherein the computer-executable instructions cause the lane change track planning apparatus to:

determine, based on a second steering wheel rotation angle in each of the at least one lane change control parameter set and a preset change trend of the steering wheel rotation angle with time, a change amount of the steering wheel rotation angle that is to be executed by the vehicle in each segment of the preset change trend; and calculate, based on the change amount of the steering wheel rotation angle and that corresponds to the each segment of the preset change trend and a third lane change control parameter other than the second steering wheel rotation angle, time required by the vehicle to complete the each segment to obtain the change with time of each of the at least one lane change control parameter set.

* * * * *

UNITED STATES PATENT AND TRADEMARK OFFICE
CERTIFICATE OF CORRECTION

PATENT NO. : 12,358,508 B2  
APPLICATION NO. : 18/175106  
DATED : July 15, 2025  
INVENTOR(S) : Xiaobin Gao Page 1 of 1

It is certified that error appears in the above-identified patent and that said Letters Patent is hereby corrected as shown below:

In the Claims

Claim 10, Column 29, Line 27: "speeds, wherein the processor is configured to cause the lane" should read "speeds, and wherein the processor is configured to cause the lane"

Signed and Sealed this  
Nineteenth Day of August, 2025

Coke Morgan Stewart  
*Acting Director of the United States Patent and Trademark Office*